J. R. & G. MITCHELL.
DRAFT DEVICE.
APPLICATION FILED MAY 26, 1913.
1,118,211. Patented Nov. 24, 1914.
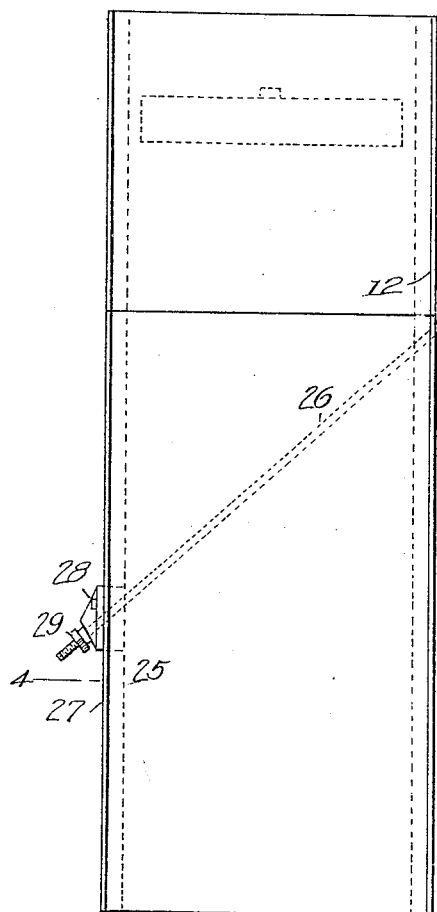
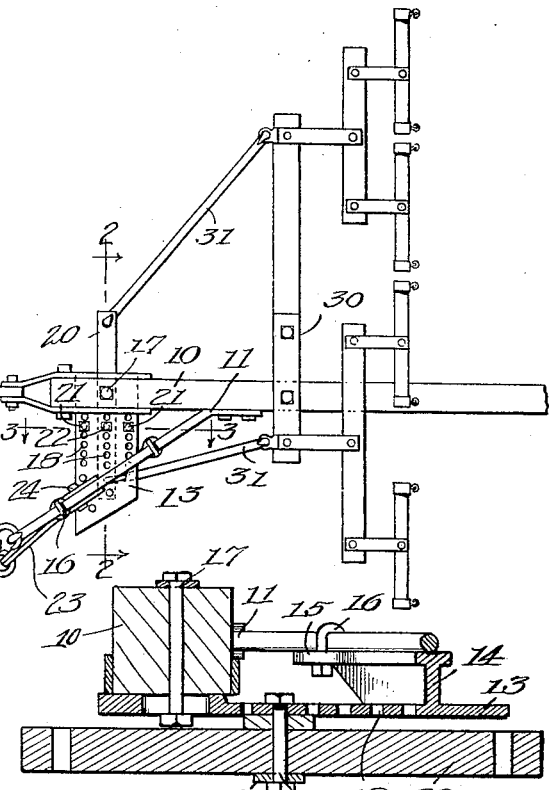
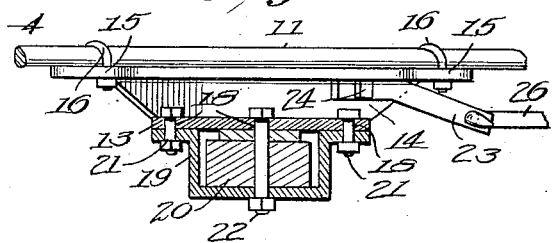
Witnesses
F. C. Barry
G. L. Neidman
Inventors
James R. Mitchell,
Grady Mitchell.
By
Attorney

UNITED STATES PATENT OFFICE.

JAMES R. MITCHELL AND GRADY MITCHELL, OF HALSELL, TEXAS.

DRAFT DEVICE.

1,118,211.  Specification of Letters Patent.  Patented Nov. 24, 1914.

Application filed May 26, 1913. Serial No. 770,019.

*To all whom it may concern:*

Be it known that we, JAMES R. MITCHELL and GRADY MITCHELL, citizens of the United States, residing at Halsell, in the county of Clay and State of Texas, have invented certain new and useful Improvements in Draft Devices, of which the following is a specification.

The draft device which is the subject matter of the present application for patent is designed more particularly for grain binders and similar agricultural machinery, and its object is to provide simple and efficient means whereby three draft animals may be placed on one side of the tongue and one draft animal on the other side without the machine deviating from a straight course. This object is attained by means of a novel combination and arrangement of parts to be hereinafter described and claimed, reference being had to the accompanying drawing, in which—

Figure 1 is a plan view showing the application of the invention. Figs. 2, 3 and 4 are sections on the lines 2—2, 3—3 and 4—4 of Fig. 1.

In the drawing 10 denotes the draft tongue of the machine, the same being provided with a brace 11 which extends diagonally rearward, and is loosely connected to the frame 12 of the machine at the forward edge thereof. The draft tongue is pivotally connected to the machine.

Mounted crosswise of the tongue 10 is a plate 13 having adjacent to one of its ends a flange 14, at the ends of which latter are ears 15. The flange 14 engages the brace 11 and is clamped thereto by U-bolts 16 passing through the ears 15. That portion of the plate which engages the tongue is fastened thereto by a bolt 17.

The plate 13 contains three rows of apertures 18, located respectively adjacent to its front and rear edges, and midway therebetween. The edge apertures are for the purpose of securing a hammer-strap 19 to which an evener bar 20 is attached, the bolts 21 securing the hammer-strap passing through said edge apertures. The intermediate apertures are for the pivot bolt 22 of the evener bar.

The hammer-strap 19 extends in the direction of the length of the tongue 10, and is adjustable laterally of the latter by reason of the transverse series of apertures in the plate 13. Thus, if the machine tends to run to one side, all that is necessary to overcome this tendency is to shift the hammer-strap to change the position of the evener bar 20.

The parts thus far described are arranged in the same manner as in our Patent No. 1,056,349, dated March 18, 1913, and a further description thereof is deemed unnecessary.

Mounted astride of the flange 14 are two flat bars 23 which are secured to the flange by a bolt 24 and extend rearwardly therefrom toward the platform 25 of the machine. To the rear ends of the bars is loosely connected a draft rod 26, said ends having apertures into which the rod is hooked. The connection between the rod and the bars is a loose or hinge connection, and it is in line with the hinge joint between the tongue 10 and the frame 12 and the brace 11 and said frame.

The rod 26 extends diagonally beneath the platform 25 to the rear edge of the platform frame 27 at the center of the platform. The frame 27 carries a bracket 28 through which the rod passes and to which it is made fast by a nut 29.

The tongue 10 carries a doubletree 30 which is connected by rods 31 to the evener bar 20.

By providing the rod 26 it is possible to hitch three horses to the machine on one side of the tongue 10 and one horse on the other side without the machine deviating from a straight course, and the platform 25 which carries the cutting mechanism runs at a right angle with the grain as it should in order to do good work.

We claim:

1. In a grain binder, a draft tongue, a plate carried by the draft tongue and projecting from one side thereof, an evener bar carried by the plate, a rod extending diagonally beneath the binder platform and secured to the back thereof, said rod being located on the same side of the tongue as the projecting portion of the aforesaid plate, and a connection between the forward end of the rod and the plate.

2. In a grain binder, a pivoted draft tongue, a plate carried by the draft tongue and projecting from one side thereof, a rod extending diagonally beneath the binder platform and secured to the back thereof, said rod being located on the same side of the tongue as the projecting portion of the aforesaid plate, and a hinged connection between the forward end of the rod and the aforesaid plate, said hinged connection being in alinement with the pivot of the tongue.

3. In a grain binder, a pivoted draft tongue, a plate carried by the draft tongue, and projecting from one side thereof, said projecting portion of the plate having a flange, bars straddling the flange and extending rearwardly therefrom, and a rod loosely connected to the rear ends of said bars in line with the pivot of the tongue, said rod extending diagonally beneath the binder platform and being secured to the back thereof.

In testimony whereof we affix our signatures in presence of two witnesses.

JAMES R. MITCHELL.
GRADY MITCHELL.

Witnesses to signature of James R. Mitchell:
E. I. KEY,
EDWIN S. MILLER.

Witnesses to signature of Grady Mitchell:
A. B. STAGGS,
J. W. WILLIS.

Copies of this patent may be obtained for five cents each, by addressing the "Commissioner of Patents, Washington, D. C."